US007509539B1

(12) United States Patent
Denefleh et al.

(10) Patent No.: US 7,509,539 B1
(45) Date of Patent: Mar. 24, 2009

(54) METHOD FOR DETERMINING CORRELATION OF SYNCHRONIZED EVENT LOGS CORRESPONDING TO ABNORMAL PROGRAM TERMINATION

(75) Inventors: Lutz Werner Denefleh, Pfungstadt (DE); Burghard Bruno Eisele, Mainz (DE); Jens Michael Hopf, Mainz (DE); Rudolf Michalak, Dackscheid (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/128,598

(22) Filed: May 28, 2008

(51) Int. Cl.
*G06F 11/00* (2006.01)

(52) U.S. Cl. .......................... 714/48; 714/38

(58) Field of Classification Search .............. 714/48
See application file for complete search history.

(56) References Cited

U.S. PATENT DOCUMENTS

| 5,872,970 | A | 2/1999 | Picket et al. |
| 5,892,812 | A | 4/1999 | Pester, III |
| 6,041,350 | A | 3/2000 | Takimoto |
| 6,634,001 | B2 * | 10/2003 | Anderson et al. .......... 714/38 |
| 6,654,375 | B1 | 11/2003 | Vedder |
| 7,023,817 | B2 | 4/2006 | Kuffner et al. |
| 7,093,284 | B2 | 8/2006 | Hildenbrand, Jr. et al. |
| 2002/0010803 | A1 | 1/2002 | Oberstein et al. |
| 2003/0084377 | A1 * | 5/2003 | Parks et al. .................. 714/38 |
| 2003/0154402 | A1 | 8/2003 | Pandit et al. |
| 2005/0120273 | A1 * | 6/2005 | Hudson et al. .............. 714/38 |
| 2005/0204199 | A1 * | 9/2005 | Harper et al. ............... 714/38 |
| 2007/0043974 | A1 | 2/2007 | LeBlanc et al. |

* cited by examiner

*Primary Examiner*—Michael C Maskulinski
(74) *Attorney, Agent, or Firm*—McGinn IP Law Group, PLLC

(57) ABSTRACT

A method of correlating a plurality of event logs surrounding abnormal program termination of a plurality of networked computers, includes continuously generating event records that includes operating system events, information technology (IT) infrastructure events and program application events, transmitting and storing the event records to a monitoring database, generating and transmitting an abnormal program termination event record when a computer experiences abnormal program termination to the monitoring database, and synchronizing the stored event records and the abnormal program termination event record of the computer based on receiving the abnormal program termination event record at the monitoring database, and with respect to the abnormal program termination event record. The method further includes creating and storing a specific synchronized event log based on the synchronizing of the event records and comparing it with previously stored synchronized event logs to determine if one of a match and a specific degree of similarity exists.

1 Claim, 3 Drawing Sheets

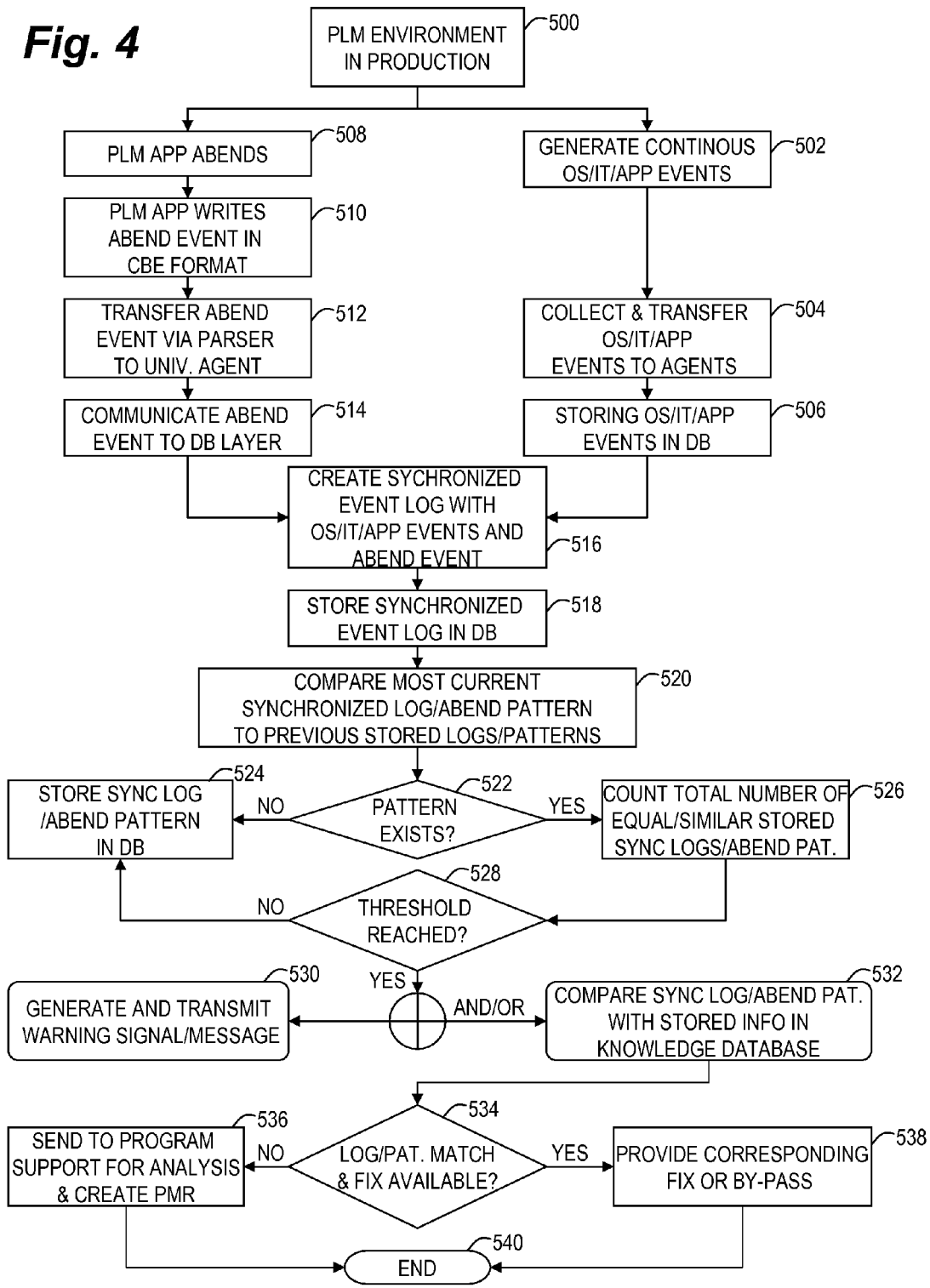

METHOD FOR DETERMINING CORRELATION OF SYNCHRONIZED EVENT LOGS CORRESPONDING TO ABNORMAL PROGRAM TERMINATION

BACKGROUND OF THE INVENTION

1. Field of the Invention

The present invention generally relates to reducing application MTBF (mean time before failure) rates in large-scale and/or widely distributed PLM (product lifecycle management) applications within an IT (information technology) infrastructure environment by the generation and extraction of data from workstations within the PLM environment that experience abnormal program termination.

2. Description of the Related Art

Current IT departments are not able to create an accurate problem description of an abnormal program termination since they traditionally only have access to abnormal program termination logs that are incapable of creating a comprehensive and detailed event history in the workstation leading up to the abnormal program termination of an application.

In a PLM environment, each designer has his own workstation with a PLM application running on it. While the PLM application is running, the application may experience an abnormal program termination, known as an "abend," (abnormal end), from time to time. In most cases, the designer will not inform the IT department about this crash, but will reboot the workstation on his own and continues with his work. At the time of the abend, the PLM application creates a log detailing the nature of the abend. This situation may happen hundreds of times with workstations across the PLM design department or a multi-location collaborative environment. These abends, and their lack of proper reporting, cause significant deterioration of performance of individual design departments and the total PLM environment.

The IT department typically recognizes the abend logs some time after the occurrence of the abend. The IT department may create problem descriptions for these abends to supply a correction from the software supplier, via a PMR (problem record). To create a problem report, the IT department needs to know the statistically significant pattern of events surrounding abnormal program termination. Normally, statistics on these pattern of events must be created manually to determine which set of abnormal program termination events need to be prioritized for fixing.

Currently, there is no information collected immediately preceding the abnormal program termination detailing the events that occur in the operating system (OS) and the IT-infrastructure of a workstation.

Without this information, statistically significant groups of events leading to abnormal program termination cannot be accurately determined and meaningfully analyzed in conjunction with OS and IT-infrastructure events.

SUMMARY OF THE INVENTION

In view of the foregoing and other exemplary problems, drawbacks, and disadvantages of the conventional methods and structures, a purpose of the exemplary aspects of the present invention is to provide a method and system that correlates a plurality of event logs surrounding abnormal program termination of a plurality of networked computers.

An exemplary aspect of the present invention includes a method of continuously generating event records for each computer of the plurality of networked computers, the event records comprising operating system events, information technology (IT) infrastructure events and program application events, transmitting and storing the continuously generated event records to a monitoring database, generating an abnormal program termination event record when a computer of the plurality of networked computers experiences abnormal program termination, transmitting the abnormal program termination event record to the monitoring database, synchronizing the stored event records and the abnormal program termination event record of the computer based on receiving the abnormal program termination event record at the monitoring database, and with respect to the abnormal program termination event record, creating and storing a specific synchronized event log for the abnormal program termination of the computer based on the synchronizing of the event records with respect to a specific abnormal program termination event record, comparing the specific synchronized event log with previously stored synchronized event logs to determine one of a match and a specific degree of similarity existing between the previously stored synchronized event logs and the specific synchronized event record, counting a total number of one of a number of the matches and a number of the specific degrees of similarity between the previously stored synchronized event logs and the specific synchronized event log, determining when the total number of the one of the number of matches and the number of specific degrees of similarity being one of equal to and greater than a predetermined threshold number, and providing, when the total number of the one of the number of matches and the number of specific degrees of similarity being determined to one of reach and exceeded the predetermined threshold number, one of, one of a warning signal and message, and a knowledge solution designed to prevent future occurrences of a specific abnormal program termination, wherein the knowledge solution corresponds to the specific synchronized event log.

In another exemplary aspect of the present invention, the abnormal program terminal event record being generated in a text format and transmitted to a parser that parses the abnormal program terminal event record before transmission to a universal agent in the monitoring database.

Another exemplary aspect of the present invention further includes determining an abnormal program termination event pattern from the specific synchronized event log by grouping selected event records of the operating system events, information technology (IT) infrastructure events and program application events with respect to the abnormal program termination event record.

Another exemplary aspect of the present invention further includes comparing the abnormal program termination event pattern with previously stored abnormal program termination event patterns to determine one of a match and a degree of similarity between the abnormal program termination event pattern and the previously stored abnormal program termination event patterns.

Another exemplary aspect of the present invention further includes comparing a specific abnormal program termination event pattern to stored abnormal program termination event patterns in a knowledge database, and providing a knowledge solution from the knowledge database associated with a stored abnormal program termination event pattern when the specific abnormal program termination event pattern corresponds to the stored abnormal program termination event pattern in the knowledge database.

Another exemplary aspect of the present invention further includes comparing a specific abnormal program termination event pattern to stored abnormal program termination event pattern in a knowledge database, creating and storing a maintenance record when the specific abnormal program termination event pattern does not correspond to the stored abnormal program termination event pattern in the knowledge database.

In another exemplary aspect of the present invention, each of the event records includes an event description and an event time.

In another exemplary aspect of the present invention, each of the operating system event records, IT-infrastructure event records and program application event records are transmitted discretely to corresponding receiving agents of the monitoring database.

In another exemplary aspect of the present invention, providing the knowledge solution further includes comparing the synchronized event logs to stored synchronized event logs in a knowledge database.

In another exemplary aspect of the present invention, said providing the knowledge solution further includes comparing the synchronized event logs to stored synchronized event logs in a knowledge database.

Another exemplary aspect of the present invention further includes one of providing the knowledge solution from the knowledge database associated with a specific stored synchronized event log corresponding to a stored synchronized event log in the knowledge database, and creating and storing a maintenance record when the synchronized event log does not correspond to any of the stored synchronized event logs in the knowledge database.

Another exemplary aspect of the present invention, includes a system that correlates a plurality of event logs surrounding an abnormal program termination of a computer in a plurality of networked computers, the system comprising: a plurality of networked computers, a monitoring database including a data gathering layer, a database and data mining layer, and a presentation layer, each of the plurality of networked computers continuously generating event records including operating system events, information technology (IT) infrastructure events and program application events, transmitting the continuously generated event records to corresponding receiving agents in the data gathering layer of the monitoring database, generating an abnormal program termination event record when a computer of the plurality of networked computers experiences abnormal program termination, transmitting the abnormal program termination event record via a parser to a universal agent in the data gathering layer of the data monitoring database, transmitting to store the event records and the abnormal program termination event record to the database and data mining layer, synchronizing the stored event records and the termination event record of the computer based on receiving the termination event record at the monitoring database and with respect to the termination event record, creating and storing a synchronized event log for the abnormal program termination of the computer based on the synchronizing of the event records with respect to the termination event record, comparing the synchronized event log with previously stored synchronized event logs to determine one of a match and a specific degree of similarity existing between the synchronized event log with previously stored synchronized event logs, counting a total number of one of a number of matches and a number of specific degrees of similarity between the synchronized event log with previously stored synchronized event logs, determining when the total number of one of the number of matches and the number of specific degrees of similarity being one of equal to and greater than a predetermined threshold number, and providing, when the predetermined threshold number being determined to be one of reached and exceeded by the total number, one of, one of a warning signal and message via the presentation layer based on the determining, and a knowledge solution via the presentation layer designed to prevent future occurrences of the abnormal program termination, the knowledge solution associated with the abnormal program termination event.

A key component of the present invention is to significantly improve application mean time before failure (MTBF) in a PLM environment by determining the number of statistically significant correlations between workstation event logs taking OS, IT-infrastructure and application events into account related to an abnormal program termination event.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 4 illustrates a flowchart that performs a method according to the exemplary aspects of the present invention.

DETAILED DESCRIPTION OF EXEMPLARY EMBODIMENTS OF THE INVENTION

Figure 1:
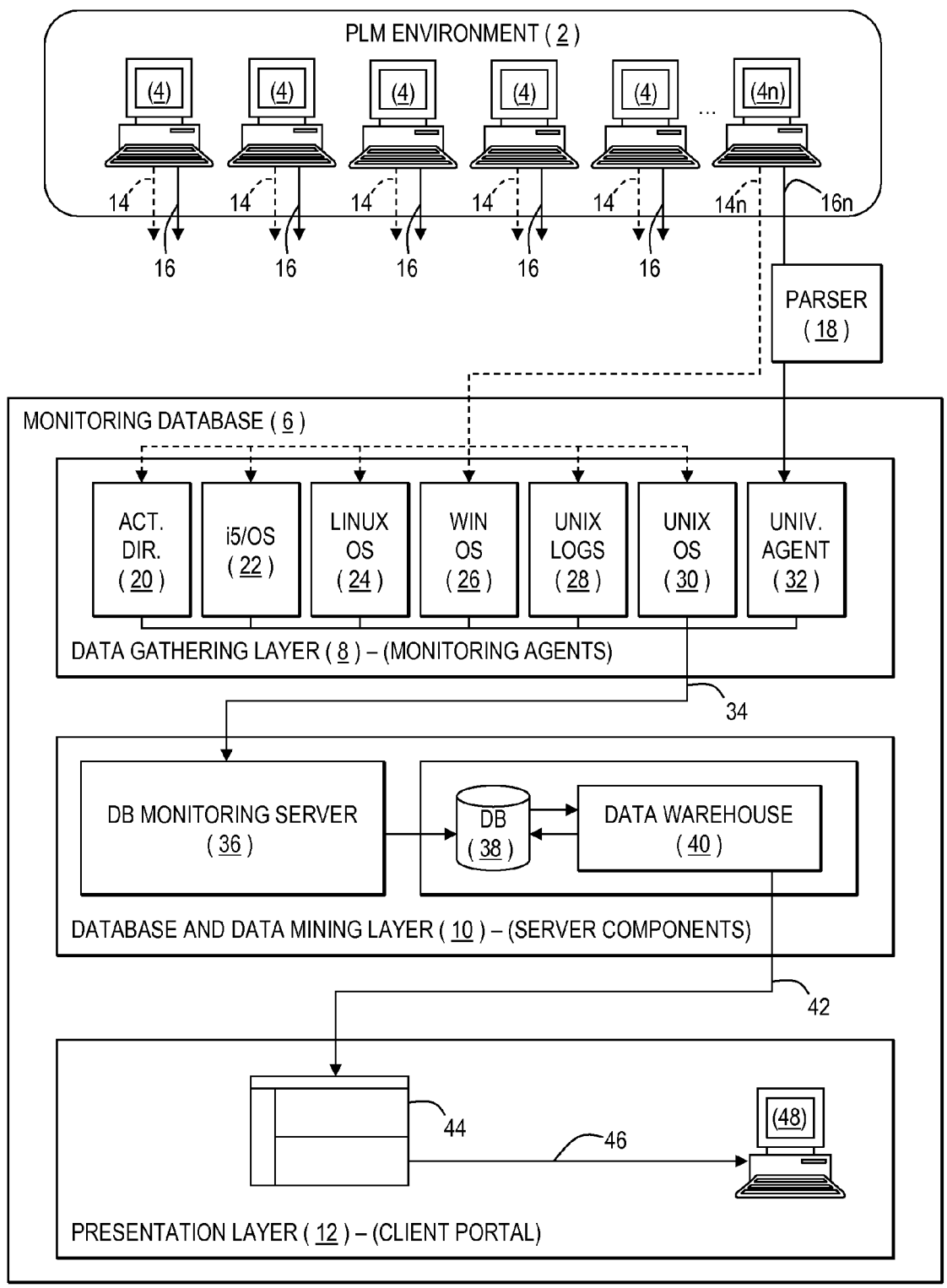
FIG. 1 illustrates an exemplary embodiment of the present invention detailing a PLM environment in communication with a monitoring database.

Referring now to the drawings, and more particularly to FIGS. 1-4, there are shown exemplary embodiments of the method and structures of the present invention.

FIG. 1 illustrates a collaborative PLM (product lifecycle management) environment 2 having a plurality of workstations 4-4n. An exemplary PLM environment may include large-scale integrated networked design and manufacturing applications, for example, CATIA™ developed by Dassault Systemes™. Each of the plurality of workstations 4-4n independently communicate date from the workstations with a monitoring database 6, (for example, a Tivoli™ monitoring database), through a data gathering layer 8 that includes a number of monitoring agents 20-32, to a database and data mining layer 10 which generated information to be output at a presentation layer 12 that includes a client portal.

Each workstation 4-4n in the PLM environment 2 continuously communicates OS events, IT-infrastructure events, and application events as event logs to the monitoring database 6 via event communication paths 14-14n. Likewise, each workstation 4-4n communicates information of an abend event to the monitoring database 6 via abend event communication paths 16-16n.

Workstation 4n, identical to workstations 4, illustrates event communication path 14n in communication with receiving agents 20-30 of the data gathering layer 8 of the monitoring database 6. Each OS event, IT-infrastructure event and application event from the workstation 4n, (and likewise from workstations 4), is routed to a corresponding OS receiving agent, for example, an active directory agent 20, and i5/OS (and i5/OS V6R1, also known as IBM i™ 6.1) agent 22, LINUX OS agent 24, Windows OS agent 26, UNIX logs agent 28 and UNIX OS agent 30. These OS, IT-infrastructure and application events may be written as SAN (Storage Area Network) logs.

The OS, IT-infrastructure and application events are generated and transmitted continuously from the workstations 4-4n to the receiving agents 20-30 of the data gathering layer 8 where they are then transferred via a communication bus 34 to the database and data mining layer 10.

When a workstation, for example 4n, has an abnormal application termination, an "abend," the workstation creates an abend record (or trace) of the abend event in a text file format, for example, in CBE (common base event) format. The abend record may be then transmitted via communication path 16n to parser 18 which translates the abend record into an appropriate format and forwards it to a universal agent 32 in the data gathering layer 8. A universal agent 32 receives and communicates the abend record via communication bus 34 to the database and data mining layer 10. Agents 20-32 of the data gathering layer 8 are monitoring agents that may be Tivoli™ Agents.

The OS, IT-infrastructure and application events are received at the database monitoring server 36 which stores each of the events in the database 38. Database monitoring server 36 may be a Tivoli™ Express Server, and database 38 may be a Tivoli™ DB2 Express. When the abend event record is transmitted via universal agent 32 to the database monitoring server 36 via communication bus 34, a data warehouse 40 identifies the OS, IT-infrastructure and application events preceding the abend event record and corresponding to the workstation where the abend occurred, (for example, workstation 4n). The data warehouse 40 may be a Tivoli™ Data Warehouse.

After the data warehouse 40 determines if there is a significant statistical correlation between the events surrounding the workstation's abend and any stored event patterns of previous abend events, (as described below with respect to FIGS. 2-3), the data warehouse 40 communicates via bus 42 to presentation layer 12 where a warning message 44 or warning signal may be generated and transmitted via communication line 46 to a user interface 48 of the IT department managing the PLM environment.

Figure 2:
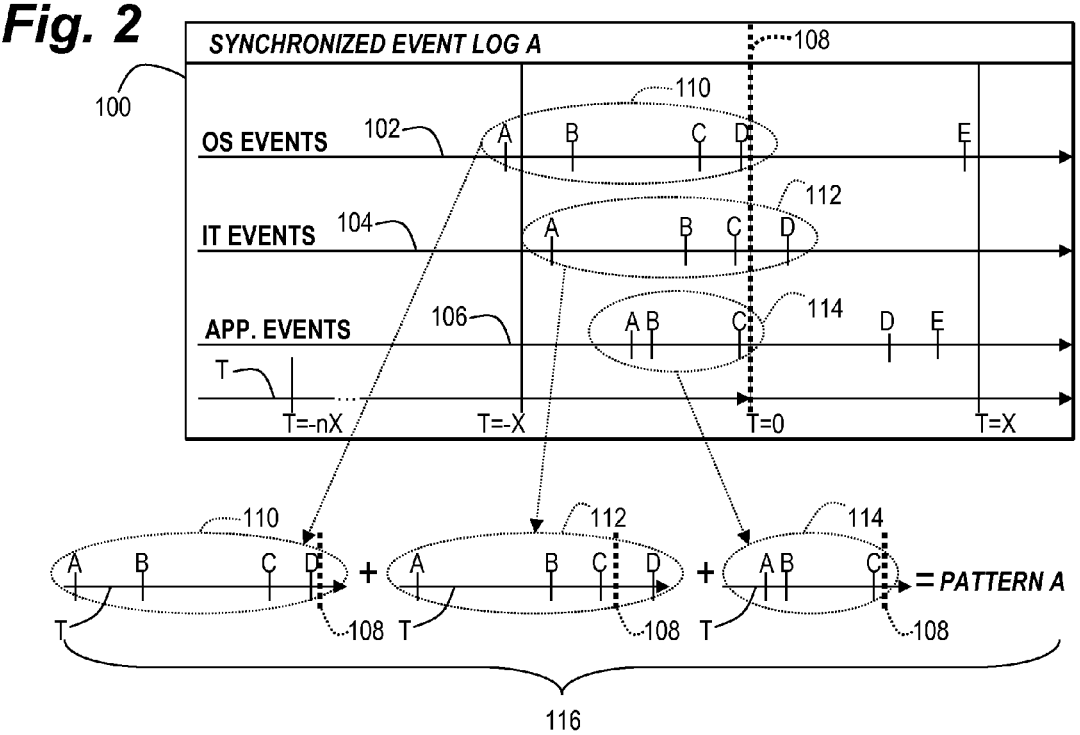
FIG. 2 illustrates an exemplary configuration of the creation of a synchronized event log and corresponding selection of an extracted abend pattern from the synchronized event log.

FIG. 2 illustrates the creation of a synchronized event log 100 by the data warehouse 40 in the database and data mining layer 10. As mentioned above, when the record of an abend event is received at the database and data mining layer 10, the data warehouse 40 begins a data retrieval process where all OS events, IT-infrastructure events and application events of the workstation where the abend occurred are synchronized with respect to each other in time and with respect to the abend event. OS events are aligned on an OS event timeline 102. IT-infrastructure events are aligned on and IT-infrastructure event timeline 104. Application events are aligned on an application event timeline 106. Each of these timelines 102, 104 and 106 are then synchronized along a timeline T with respect to the time the abnormal program termination event occurred 108, that is where T=0 of the timeline T. Each recorded event contains information indicating a specific event description and the time the event took place. Since events are continuously transferred and stored in the database 38, events before and after the abnormal program termination 108 are included in the synchronized event log 100. For example, the OS event timeline of 102 contains events A, B, C, D before the abnormal program termination 108, and event E subsequent the abnormal program termination 108.

Data warehouse 40 then selects relevant event patterns from each of the event timelines 102, 104 and 106 corresponding to the abnormal program termination event 108. For example, the event pattern 110 includes OS events A, B, C and D. The event pattern 112 includes IT-infrastructure events A, B, C and D. The event pattern 114 includes application events A, B and C. The selection of the event patterns by data warehouse 40 may be based upon a predetermined amount of time both before and after the abnormal program termination event 108, specific types of events, and/or predetermined combinations of particular events.

Data warehouse 40 then generates an abend pattern "A" 116 from the combination of each of the event patterns 110, 112 and 114, where pattern "A" corresponds to a combination of each of the event patterns synchronized in time with respect to the abend event 118.

Figure 3:
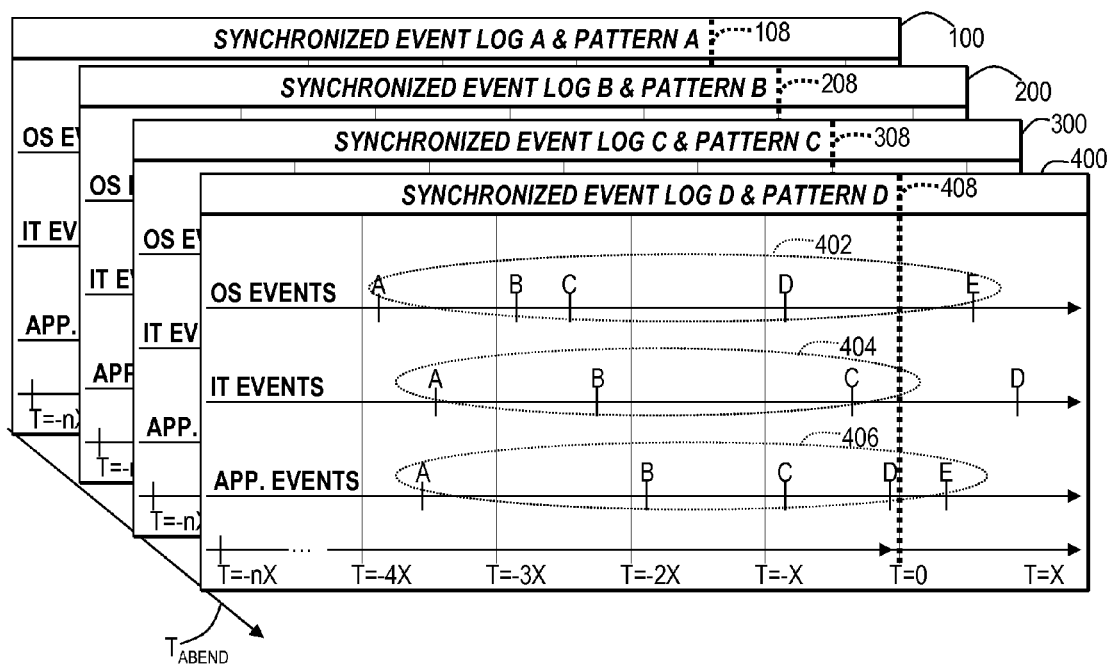
FIG. 3 illustrates an exemplary configuration of a plurality of synchronized event logs used for determining a correlation between a recent extracted abend pattern.

FIG. 3 illustrates a plurality of synchronized event logs, 100, 200, 300 and 400 that were generated by the data warehouse 40 and stored in the database 38 of the database and data mining layer 10, where each of these synchronized event logs corresponds to a single abnormal program termination event 108, 208, 308 and 408 over timeline TABEND. For example, abend pattern D includes OS event pattern 402, IT-infrastructure event pattern 404 and application event pattern 406 synchronized with respect to time and the abend event 408.

Data warehouse 40 then performs a correlation process of the latest abend pattern selected from the synchronized event log to all other stored abend patterns. For example, abend pattern D including the combination of event patterns 402, 404 and 406, may be compared to previously stored abend pattern C, abend pattern B, and abend pattern A to determine either an identical match, or a statistically significant correlation. For example, abend pattern D may be identical to abend pattern C with the sequence of each of the synchronized events, and/or the timing of each of the synchronized events.

If a wider range of correlation is necessary in situation where exact matches may eliminate statistically significant similar matches, a correlation range may be employed. For example, abend pattern D may be determined to have a correlation of 80 percent to abend pattern B given the sequence of each of the synchronized events and/or the timing of each of the synchronized events. If a range of correlation is set by the system to identify all matches with greater than or equal to a 75 percent correlation, then a statistically significant match would be indicated between the comparison of abend patterns B and D having an 80 percent correlation.

Data warehouse 40 then determines how many identical matches or statistically significant correlations there are with respect to the latest processed abend pattern after all previously stored abend patterns are compared. If the number of identical matches or statistically significant correlations may be greater than or equal to a predetermined threshold number, data warehouse 40 may generate and transmit a message or signal to the presentation layer 12, and/or determine if there may be any fix or by-pass solution with respect to the abend event. This will be described in more detail in FIG. 4 below.

FIG. 4 illustrates a logic flowchart of the method of the present invention.

In a PLM environment in operating production 500, each workstation 4-4n continuously generates operating system, IT-infrastructure and application events 502. Each of these events may be continually collected and transferred 504 to agents 20-30 in the data gathering layer 8 of monitoring database 6. The database and data mining layer 10 receives these events and stores them 506 in database 38 for subsequent creation of a synchronized event log, (for example 100), representing each workstation's 4-4n events preceding and surrounding the occurrence of an abend.

Simultaneously with the generation and collection of the events of 502-506, in the PLM environment 500, a PLM application on a workstation experiences an abnormal program termination 508. The PLM application writes an abend event record in a standard text CBE format 510. This text file of the abend event record may be transferred 512 to parser 18 that codes the abend event record for receipt at a universal agent 32 in the data gathering layer 8. Universal agent 32 then transfers 514 the abend event record to the database and data mining layer 10.

When that the abend event record is received in the database and data mining layer 10, data warehouse 40 creates a synchronized event log with the operating system events, IT-infrastructure events, application events and the abend event 516. The synchronized event log of the most currently received abend event may be stored 518 in the database 38, and may be then compared to previously stored synchronized event logs 520 and their corresponding abend patterns (for example, 116).

If, after comparison between the most current abend pattern and all previously stored abend patterns, it is determined that no proper match exists, whether exactly or a statistically significant, (as described above), the synchronized event log or the abend pattern may be stored the 524 in the database 38 for future comparison.

However, if after comparison between the most current abend pattern and all previously stored abend patterns, it is determined that a proper match exists 522, whether exactly or a statistically significant, (as described above), data warehouse 40 counts the total number of exact or statistically significant matches corresponding to the most current abend pattern 526. Data warehouse 40 then determines if the total number of exact or statistically significant matches may be equal to or greater than a predetermined threshold number 528.

If the total number of exact or statistically significant matches is less than the predetermined threshold number, the most current synchronized event log and abend pattern may be stored in database 38 for future comparison. However, if the total number of exact or statistically significant matches may be equal to or greater than the predetermined threshold number, the data warehouse 40 may generate and transmit a warning signal and/or message 530, and/or compare the synchronized event log and/or corresponding abend pattern with stored information in a knowledge database 532.

If the synchronized event log and/or corresponding abend pattern matches 534 corresponding information in the knowledge database indicating that a fix or by-pass solution may be available for that specific synchronized event log and/or corresponding abend pattern, then the corresponding fix or by-pass solution may be retrieved from the knowledge database and transmitted to appropriate personnel to correct the specific abend event 538. This solution may also be provided automatically to a customer or customers whose workstations have been identified as creating a specific synchronized log event and/or abend pattern that the knowledge solution is designed to repair.

The knowledge database may be an abend pattern knowledge database where synchronized log events and/or abend patterns are stored and identified with specific fixes (hotfixes), service packs, or by-pass (work-around) solutions. Each time a fix, or the like, may be created for a synchronized log events and/or abend pattern, the pattern knowledge database may be updated.

If the synchronized event log and/or corresponding abend pattern contains no match to correspond information in a knowledge database, information may be transmitted to support personnel who are able to recreate the pattern of events in a test facility to create a new problem report (PMR) 536. The method then terminates at the end 540 for each reported abend event.

While the invention has been described in terms of one or more exemplary embodiments, those skilled in the art will recognize that the invention can be practiced with modification within the spirit and scope of the appended claims. Specifically, one of ordinary skill in the art will understand that the drawings herein are meant to be illustrative, and the design of the inventive assembly is not limited to that disclosed herein but may be modified within the spirit and scope of the present invention.

Further, Applicant's intent is to encompass the equivalents of all claim elements, and no amendment to any claim the present application should be construed as a disclaimer of any interest in or right to an equivalent of any element or feature of the amended claim.

What is claimed is:

1. A method of correlating a plurality of event logs surrounding abnormal program termination of a plurality of networked computers, said method comprising:

continuously generating event records for each computer of said plurality of networked computers, said event records comprising operating system events, information technology (IT) infrastructure events and program application events;

transmitting and storing said continuously generated event records to a monitoring database;

generating an abnormal program termination event record when a computer of said plurality of networked computers experiences abnormal program termination;

transmitting said abnormal program termination event record to said monitoring database;

synchronizing said stored event records and said abnormal program termination event record of said computer based on receiving said abnormal program termination event record at said monitoring database, and with respect to said abnormal program termination event record;

creating and storing a specific synchronized event log for said abnormal program termination of said computer based on said synchronizing of said event records with respect to a specific abnormal program termination event record;

comparing said specific synchronized event log with previously stored synchronized event logs to determine one of a match and a specific degree of similarity existing between said previously stored synchronized event logs and said specific synchronized event record;

counting a total number of occurrences of one said match and said specific degree of similarity between said previously stored synchronized event logs and said specific synchronized event log;

determining when said total number of occurrences of said one of said match and said specific degree of similarity being one of equal to and greater than a predetermined threshold number; and providing, when said total number of occurrences of said one of said match and said specific degree of similarity are determined to one of reach and exceed said predetermined threshold number, one of:
a warning signal;
a message; and
a knowledge solution designed to prevent future occurrences of a specific abnormal program termination, wherein said knowledge solution corresponds to said specific synchronized event log.

* * * * *